United States Patent
Franklin et al.

(10) Patent No.: US 12,452,057 B2
(45) Date of Patent: Oct. 21, 2025

(54) METHODS AND SYSTEMS OF A PACKET ORCHESTRATION TO PROVIDE DATA ENCRYPTION AT THE IP LAYER, UTILIZING A DATA LINK LAYER ENCRYPTION SCHEME

(71) Applicants: Kelvin R. Franklin, Fremont, CA (US); Jonathan Flack, Seattle, WA (US)

(72) Inventors: Kelvin R. Franklin, Fremont, CA (US); Jonathan Flack, Seattle, WA (US)

( * ) Notice: Subject to any disclaimer, the term of this patent is extended or adjusted under 35 U.S.C. 154(b) by 100 days.

(21) Appl. No.: 18/130,425

(22) Filed: Apr. 4, 2023

(65) Prior Publication Data

US 2024/0106647 A1 Mar. 28, 2024

Related U.S. Application Data

(63) Continuation-in-part of application No. 16/983,176, filed on Aug. 3, 2020, now abandoned.

(51) Int. Cl.
 *H04L 9/40* (2022.01)
 *H04L 9/08* (2006.01)
 *H04L 9/30* (2006.01)

(52) U.S. Cl.
 CPC ......... *H04L 9/3066* (2013.01); *H04L 9/0852* (2013.01)

(58) Field of Classification Search
 None
 See application file for complete search history.

(56) References Cited

U.S. PATENT DOCUMENTS

| | | | | |
|---|---|---|---|---|
| 7,120,791 | B2 * | 10/2006 | Volpano | H04L 12/4641 713/153 |
| 8,832,776 | B1 * | 9/2014 | Natarajan | G06F 21/74 726/1 |
| 11,012,507 | B2 * | 5/2021 | Tumuluru | H04L 63/029 |
| 2014/0056307 | A1 * | 2/2014 | Hutchison | H04L 12/56 370/394 |
| 2015/0058682 | A1 * | 2/2015 | Nagumo | G06F 11/0724 714/47.3 |
| 2015/0124828 | A1 * | 5/2015 | Cj | H04L 12/4633 370/392 |
| 2015/0301975 | A1 * | 10/2015 | Garg | G06F 13/4221 710/267 |
| 2015/0334008 | A1 * | 11/2015 | Kim | H04L 45/34 709/238 |

(Continued)

OTHER PUBLICATIONS

Green et al., "https:/Avww.ric-editor.org/ric/rfc5656.txt", Dec. 2009, Network Working Group, pp. 1-18 (Year: 2009).*

*Primary Examiner* — Trang T Doan

(57) ABSTRACT

In one aspect, a method for packet orchestration to provide data encryption at the internet protocol (IP) layer, includes the step of providing a quantum secure pre-shared key derivation scheme for a data link layer bulk encryption algorithm, meaning the ability to setup a separate communication channel, via the SSH protocol, and leverage ECDH over said channel to share pre-shared keys. The method includes the step of providing a set of software-based network bridges. The method includes the step of assigning a set of network ports to specific bridges, wherein the set of network ports implement segmentation and isolation based on an organizational policy.

11 Claims, 7 Drawing Sheets

(56) References Cited

U.S. PATENT DOCUMENTS

| | | | |
|---|---|---|---|
| 2016/0065407 A1* | 3/2016 | Saltsidis | H04L 41/0853 370/255 |
| 2016/0378545 A1* | 12/2016 | Ho | G06F 11/302 718/107 |
| 2019/0042310 A1* | 2/2019 | Browne | H04L 47/24 |
| 2019/0173850 A1* | 6/2019 | Jain | H04L 9/3236 |
| 2019/0372948 A1* | 12/2019 | Varghese | H04L 63/0485 |
| 2021/0185025 A1* | 6/2021 | Wang | G06F 9/5077 |

* cited by examiner

ENABLE FUNCTION OF AND CONFIGURE THE CPU CORES TO MAXIMIZE ITS USE AS AN ENCRYPTION/DECRYPTION ENGINE
202

PROVISION CPU CORES IN A MANNER SUFFICIENT TO ALLOW FOR SERVICES OTHER THAN ENCRYPTION /DECRYPTION
204

ENABLE AND CONFIGURE ETHERNET CONTROLLER ENCAPSULATION/DECAPSULATION OFFLOADING FUNCTIONALITY TO MAXIMIZE THE EFFICIENT USE OF SPECIFIED FEATURES
302

PROVISION SYSTEM SUCH THAT SPECIFIC PACKETS FROM AND TO SPECIFIC BRIDGES ARE TRANSPORTED ON PROPER TUNNEL, BASED ON THE POLICY OF ORGANIZATION
304

ENABLE AND CONFIGURE ETHERNET CONTROLLER TO OFFLOAD THE REQUIREMENT FOR THE CPU TO HANDLING SPECIFIC NETWORK FUNCTIONS
402

ORCHESTRATE A HASHING METHOD THAT CONTROLS IRQ QUEUE AFFINITY TO ALLOW FOR MAXIMUM DISTRIBUTION OF NETWORK DATA ACROSS CPU CORES
404

METHODS AND SYSTEMS OF A PACKET ORCHESTRATION TO PROVIDE DATA ENCRYPTION AT THE IP LAYER, UTILIZING A DATA LINK LAYER ENCRYPTION SCHEME

CLAIM OF PRIORITY

This application claims priority to U.S. patent application Ser. No. 16/983,176, filed on 3 Aug. 2020, and titled METHODS AND SYSTEMS OF A PACKET ORCHESTRATION TO PROVIDE DATA ENCRYPTION AT THE IP LAYER, UTILIZING A DATA LINK LAYER ENCRYPTION SCHEME. This patent application is hereby incorporated by reference in its entirety.

BACKGROUND

1. Field

This application relates generally to computer networking, and more specifically to a system, article of manufacture and method for implementing a packet orchestration to provide data encryption at the IP layer, utilizing a data link layer encryption scheme.

2. Related Art

Every day, a 2.5 quintillion bytes of data are created. This is equivalent to 50,000 1 GB USB memory sticks being filled every second. This tremendous amount of data represents a significant opportunity for organizations that have discovered how to monetize the data but has simultaneously also created a problem for security professionals to both transport and store the data securely. Secure transport of high volume of network data and the challenges it poses for many organizations can be critical asset. Enterprise networks are the lifeblood of modern organizations. These networks transport the communications between users, applications, as well as businesses and their customers, partners, and employees. With the growth of the Internet of Things, billions of devices are adding to the rapid increase in the production of network data and or telemetry.

In an effort to understand their business better and gain competitive advantages, organizations have begun to collect and analyze the data about the date (e.g. network telemetry, etc.) to help both protect and better understand the network environment. This is not limited to user data but, with the advent of the Internet of Things, it often represents network telemetry from a myriad of sensors and or non-human devices.

SUMMARY OF THE INVENTION

In one aspect, a method for packet orchestration to provide data encryption at the internet protocol (IP) layer, includes the step of providing a quantum secure pre-shared key derivation scheme for a data link layer bulk encryption algorithm, meaning the ability to setup a separate communication channel, via the SSH protocol, and leverage ECDH over said channel to share pre-shared keys. The method includes the step of providing a set of software-based network bridges. The method includes the step of assigning a set of network ports to specific bridges, wherein the set of network ports implement segmentation and isolation based on an organizational policy. The method includes the step of provisioning and configuring of a set of CPU cores to handle wire-speed data encryption and decryption on a per bridge segmentation standpoint, wherein each network bridge segment, has its own CPU core affinity, and recommended buffer allocation. The method includes the step of provisioning per bridge, an IP overlay encapsulation of a set of encrypted packets. The method includes the step of provisioning a Network Interface Card (NIC) offloading and packet steering functionality, wherein the NIC offloading and packet steering functionality provides network packet handling for network communications. A NIC Driver specification of the NIC provides a method for interaction with one or more interrupts (IRQs) that provide access to a CPU queue of the CPU. Each CPU core of the set of CPU cores has an ability to encrypt or decrypt traffic.

BRIEF DESCRIPTION OF THE DRAWINGS

FIG. 2 illustrates an example process for provisioning/configuration of sufficient CPU cores to handle wire speed data encryption/decryption, on a per bridge segmentation standpoint, according to some embodiments.

FIG. 3 illustrates an example process for providing a mechanism for provisioning per bridge, IP overlay encapsulation of encrypted packets, according to some embodiments.

FIG. 4 illustrates an example process for providing a mechanism for provisioning NIC offloading and packet steering functionality, according to some embodiments.

Figure 1:
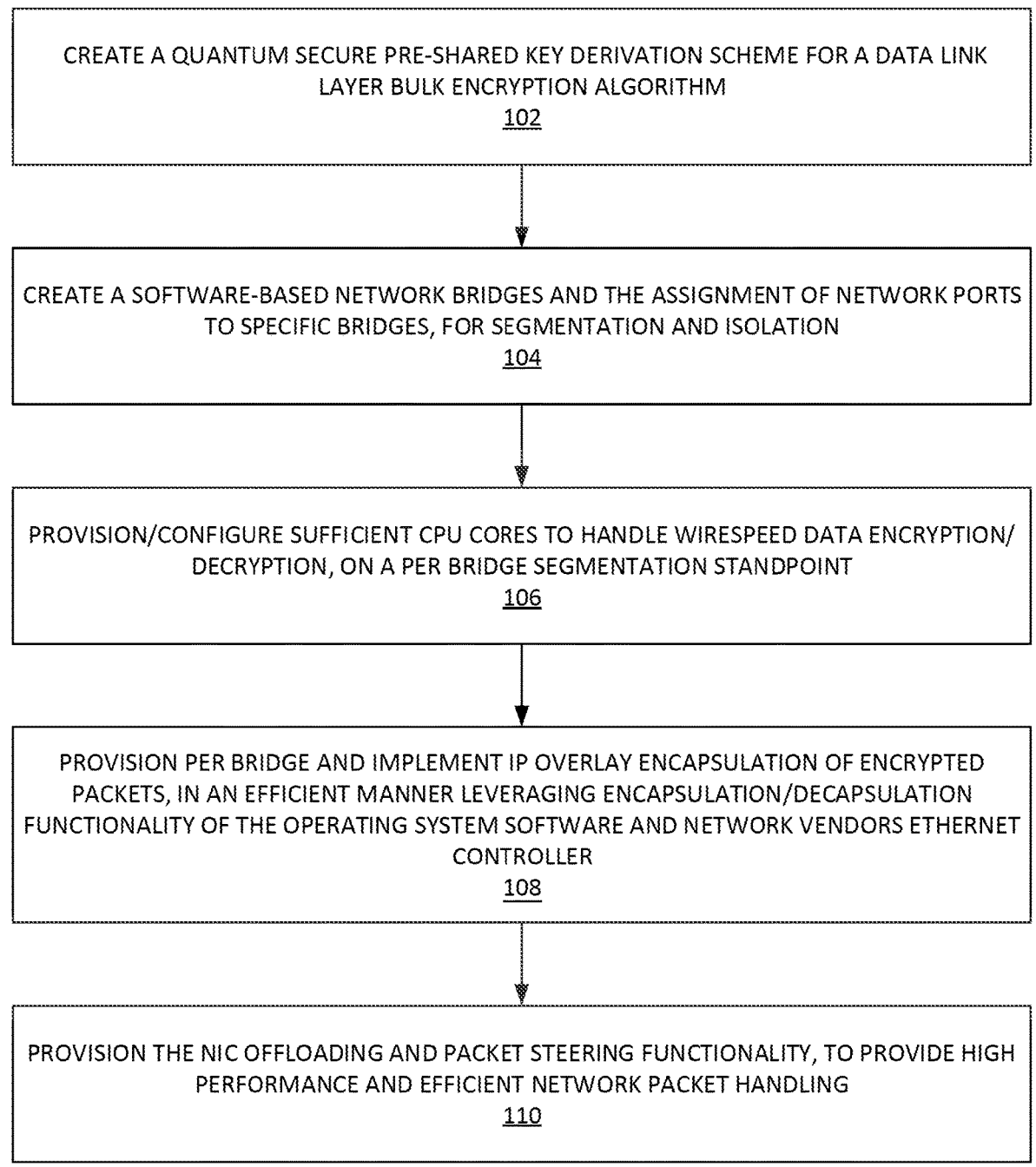
FIG. 1 illustrates an example process for packet orchestration to provide data encryption at the IP layer, utilizing a data link layer encryption scheme, according to some embodiments.

The Figures described above are a representative set and are not an exhaustive with respect to embodying the invention.

DESCRIPTION

Disclosed are a system, method, and article of manufacture of a packet orchestration to provide data encryption at the IP layer, utilizing a data link layer encryption scheme. the following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Advanced Encryption Standard (AES) is a symmetric block-cipher with fixed 128-bit blocks and key sizes of 128, 192, or 256 bits.

Bridging can be an action taken by IT network equipment to allow two or more communication networks to create an amalgamated network.

Broadcast domain is a logical division of a computer network, in which all nodes can reach each other by broadcast at the data link layer. A broadcast domain can be within the same LAN segment or it can be bridged to other LAN segments.

Data link layer (e.g. layer 2) is the second layer of the seven-layer OSI model of computer networking. The data link layer is the protocol layer that transfers data between adjacent network nodes in a wide area network (WAN) or between nodes on the same local area network (LAN) segment.

Elliptic-curve Diffie-Hellman (ECDH) is a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. It is a variant of the Diffie-Hellman protocol using elliptic-curve cryptography.

Encapsulation is a method of designing modular communication protocols in which logically separate functions in the network are abstracted from their underlying structures by inclusion or information hiding within higher level objects.

Ethernet includes a family of computer networking technologies commonly used in local area networks (LAN), metropolitan area networks (MAN) and wide area networks (WAN).

Federal Information Processing Standard Publication 140-2, (FIPS PUB 140-2), is a U.S. government computer security standard used to approve cryptographic modules.

Galois/Counter Mode (GCM) is a mode of operation for symmetric-key cryptographic block ciphers widely adopted for its performance.

Interrupt request (or IRQ) can be a hardware signal sent to the processor that temporarily stops a running program and allows a special program, an interrupt handler, to run instead. IRQs can be used to handle events such as receiving data from a modem or network card, key presses, or mouse movements.

Load balancing refers to the process of distributing a set of tasks over a set of resources, with the aim of making their overall processing more efficient. Load balancing techniques can optimize the response time for each task, avoiding unevenly overloading compute nodes Network interface card (NIC) is a computer hardware component that connects a computer to a computer network. Network interface card (NIC) drivers can be computerized instructions and information that are implemented for a NIC card to be operational after it is installed into or connected to a computer and controls a device used to connect a computer to a network.

OpenSSL is a software library for applications that secure communications over computer networks against eavesdropping and/or need to identify the party at the other end.

P-384 is the elliptic curve currently specified in NSA Suite B Cryptography for the Elliptic Curve Digital Signature Algorithm (ECDSA) and Elliptic-curve Diffie-Hellman (ECDH) algorithms.

Provisioning and configuring can mean the allocation of resource (e.g. CPU core affinity, IRQ interrupt, etc.).

Secure Shell (SSH) is a cryptographic network protocol for operating network services securely over an unsecured network.

Secure Hash Algorithms are a family of cryptographic hash functions published by the National Institute of Standards and Technology (NIST).

Segmentation and isolation can mean that the network ports are form their own broadcast domain and are isolated from other network ports dues to the physical nature of connectivity.

Tunneling protocol is a communications protocol that allows for the movement of data from one network to another. A tunneling protocol can allow private network communications to be sent across a public network (e.g. the Internet) through such process as, encapsulation, etc.

Wire speed refers to the hypothetical peak physical layer net bitrate (e.g. useful information rate) of a cable (e.g. of fiber-optical wires or copper wires) combined with a certain digital communication device, interface, or port. For example, wire speed can be the peak bitrate, connection speed, useful bit rate, information rate, or digital bandwidth capacity.

Virtual Extensible LAN (VXLAN) is a network virtualization technology that attempts to address the scalability problems associated with large cloud computing deployments. VXLAN uses a VLAN-like encapsulation technique to encapsulate Open Systems Interconnection (OSI) layer 2

Ethernet frames within layer 4 UDP datagrams, using 4789 as the default IANA-assigned destination UDP port number.

x86 is a family of instruction set architectures initially developed by Intel based on the Intel 8086 microprocessor and its 8088 variant.

Example Methods

A system and method of software-based packet orchestration application, to provide low cost, high performance, point-to-point, or point-multipoint IP Layer data encryption, leveraging a Data Link Layer encryption method, for use in an IP networking environment. The packet orchestration application allows for the use of off-the-shelf Personal Computer components. These can include, inter alia: standard Intel Computer Processing Units (CPU) and Network Interfaces to reduce cost. These can provide for quantum safe encryption, with seamless integration into an existing network infrastructures, limiting the amount of administrative tasks needed to configure, deploy, and maintain the solution.

FIG. 1 illustrates an example process 100 for packet orchestration to provide data encryption at the IP layer, utilizing a data link layer encryption scheme, according to some embodiments. Process 100 can provide packet orchestration at a low cost, high performance, point-to-point, point-multipoint IP Layer data encryption, segmentation, and privacy, with an off-the-shelf personal computer. Process 100 can use a low overhead quantum safe data Link layer encryption scheme.

Process 100 can implement a flow-pilot system. In a flow-pilot system, a software mechanism (e.g. as implemented by processes 100-400) can walk the flow through the various system components (e.g. both software and hardware components) inside of a PC (e.g. an x86 system). This step-by-step approach enables process 100 to segregate the flows for security purposes. This step-by-step approach enables process 100 to encrypt the flows as well. This can be done without specialized hardware encryptors and/or external off-loading encryptors. This can decrease cost while increasing performance on flow data as it is moving through the system.

More specifically, in step 102, a mechanism for creating a quantum secure pre-shared key derivation scheme for the data link layer bulk encryption algorithm is created. As per NIST, the recommended bulk encryption scheme is AES-GCM-128 or AES-GCM-256-bit encryption.

In step 104, process 100 can provide a mechanism for creation of software-based network bridges and the assignment of network ports to specific bridges, for segmentation and isolation. This can be based on organizational policy. Ports can be assigned to bridges based on the communication and or isolation requirements of the connected hosts. It is noted that communication and isolation requirements can mean that a particular IP and or MAC level requirements can be set as the criteria used to isolate the traffic (e.g. MAC Header information, MAC TOS, IP DSCP Bit, subnet, etc.) of a set of connected hosts.

In step 106, process 100 can provide a mechanism for provisioning/configuration of sufficient CPU cores to handle wire speed data encryption/decryption, on a per bridge segmentation standpoint.

FIG. 2 illustrates an example process for provisioning/configuration of sufficient CPU cores to handle wire speed data encryption/decryption, on a per bridge segmentation standpoint, according to some embodiments. In step 202, as per the specifications of the CPU manufacturer, process 200 can enable the function of and configure the CPU cores to maximize its use as an encryption/decryption engine. This can include an efficient queuing mechanism.

In step 206, process 200 can provision the CPU cores in a manner sufficient to allow for services other than encryption/decryption, such as is necessary for the functioning of the x86 operating system and other applications.

Returning to process 100, in step 108, process 100 can provide a mechanism for provisioning per bridge (e.g. using segment isolation) and IP overlay encapsulation (e.g. with tunneling) of encrypted packets. Segment isolation can mean that said segment leverage a criteria of MAC and IP Level of then traffic to establish isolation parameter (e.g. MAC TOS, IP DSCP Bit, subnet, etc.). This can be implemented in an efficient manner leveraging a specified encapsulation/decapsulation functionality of the operating system software and network vendors ethernet controller.

FIG. 3 illustrates an example process 300 for providing a mechanism for provisioning per bridge and IP overlay encapsulation of encrypted packets, according to some embodiments. In store 302, as per the specifications of the Ethernet Controller manufacturer, process 300 can enable and configure the Ethernet Controller encapsulation/decapsulation offloading functionality to maximize the efficient use of said features.

In step 304, process 300 can provision the system such that specific packets from and to specific bridges are transported on the proper tunnel, based on the policy of the organization.

Returning to process 100, in step 110, process 100 can provide a mechanism for provisioning NIC offloading and packet steering functionality, to provide high performance and efficient network packet handling (e.g. encapsulation, checksums, buffer allocation, etc.). In this way, process 100 can provide for high speed network communications. It is noted that provisioning and configuring a set of CPU cores to handle wire-speed data encryption and decryption on a per bridge segmentation standpoint can mean each network bridge segment has its own CPU core affinity.

FIG. 4 illustrates an example process 400 for providing a mechanism for provisioning NIC offloading and packet steering functionality, according to some embodiments. In step 402, process 400 can provide high performance and efficient network packet handling as per the specifications of the Ethernet Controller manufacturer. Step 402 can enable and configure the Ethernet Controller to offload the requirement for the CPU to handling specific network functions (e.g. TCP segmentation and reassembly, tunnel encapsulation, TCP/UDP check summing, etc.).

In step 404, as per the NIC vendor specifications, process 400 can orchestrate a hashing method that controls IRQ Queue affinity to allow for maximum distribution of network data across CPU cores.

The NIC Driver specification provides a method for interaction with the interrupts (IRQs) that provide access to the CPU Queues. Each CPU core has an ability to encrypt or decrypt traffic, based on the capabilities specified by the manufacturer. The ability to leverage core more effectively, provides a more efficient use of the CPU. When leveraging said queues, which is called CPU affinity, access to said queues is controlled by a hash method on the four (4) tuples of the TCP/IP Packet flow (e.g. Destination IP/Source IP/Destination TCP or UDP Port/Source TCP or UDP Port) outbound and inbound to the NIC. A mathematical hash of the packet flow, controls to which CPU core traffic is routed. This allows for a fine grain use of the CPU core, as packet flow information (4 tuple) is different for each flow.

Example Systems

Figure 5:
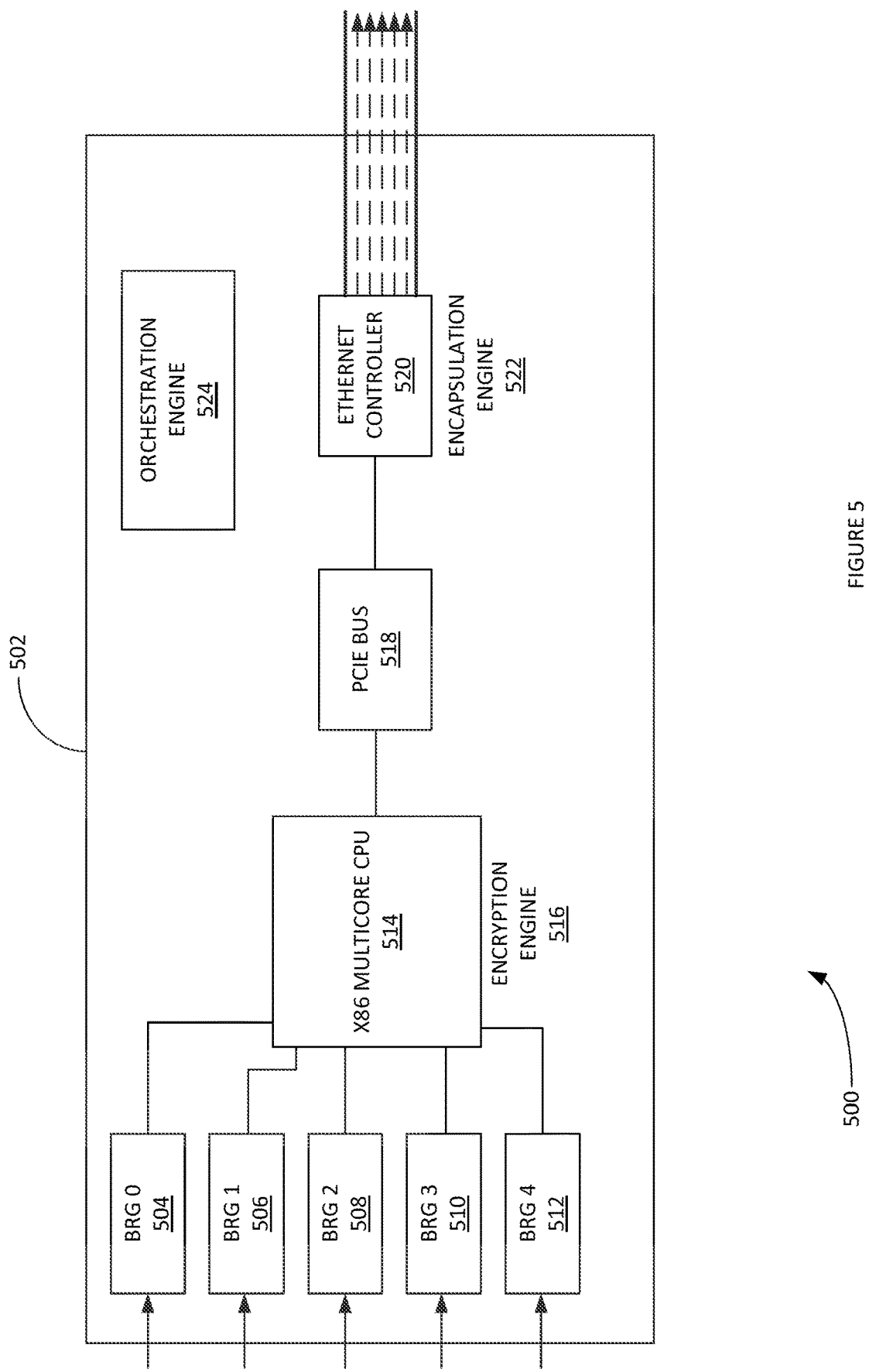
FIG. 5 illustrates an example flow-pilot system, according to some embodiments.

FIG. 5 illustrates an example flow-pilot system 500, according to some embodiments. flow-pilot system 500 can be used to implement FIGS. 1-4 supra.

More specifically, flow-pilot system 500 can include bridges 504-512. Bridges 504-512 can be implemented with a PC system 502. Bridges 504-512 can each represent a segmented group of network traffic. The network traffic can be segmented so that it does not co-mingle with other network traffic. Bridges 504-512 can be implemented in the broadcast domain. The segmented network traffic can be communicated to X86 multicore CPU 514. X86 multicore CPU 514 includes an encryption capability. Accordingly, encryption engine 516 can be implemented X86 multicore CPU 514. encryption engine 516 can implement AES-GCM-128 or AES-GCM-256-bit encryption. This can be managed by orchestration engine 524. Orchestration engine 524 can implement load balancing across cores of X86 multicore CPU(s) 514. In this way, any one core of X86 multicore CPU(s) 514 is not overwhelmed with all of the task of encryption. X86 multicore CPU(s) 514 is connected with the PCIE bus 518. From PCIE bus 518, the encrypted network traffic is handed over to ethernet controller 520 and/or a network interface (e.g. NIC). Ethernet controller 520 can implement encapsulation engine 522. On the network interface, the NIC can distribute the network traffic in an efficient manner and/or offload X86 multicore CPU(s) 514 from managing the queues. Orchestration engine 524 can instruct the NIC how to distribute the network traffic. The network traffic can be encapsulated in an IP packet by encapsulation engine 522. It can then be provided to a tunnel to be communicated across an applicable network.

Flow-pilot system 500 can implement a TCP proxy. Flow-pilot system 500 can tell each end of a TCP communication to continue sending, while flow-pilot system 500 handles the management of the network flow.

Figure 6:
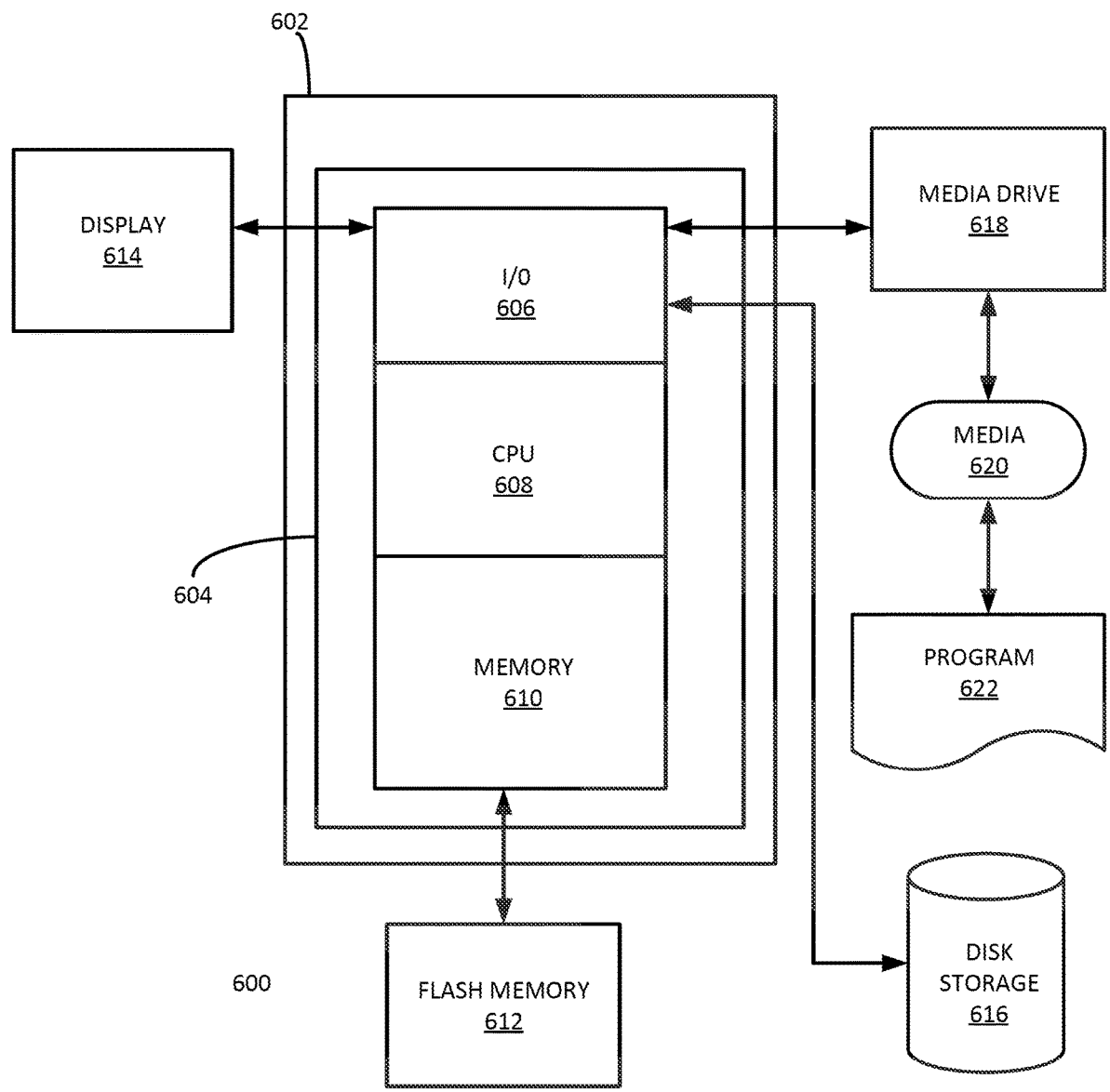
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Link Encryption Processes

Figure 7:
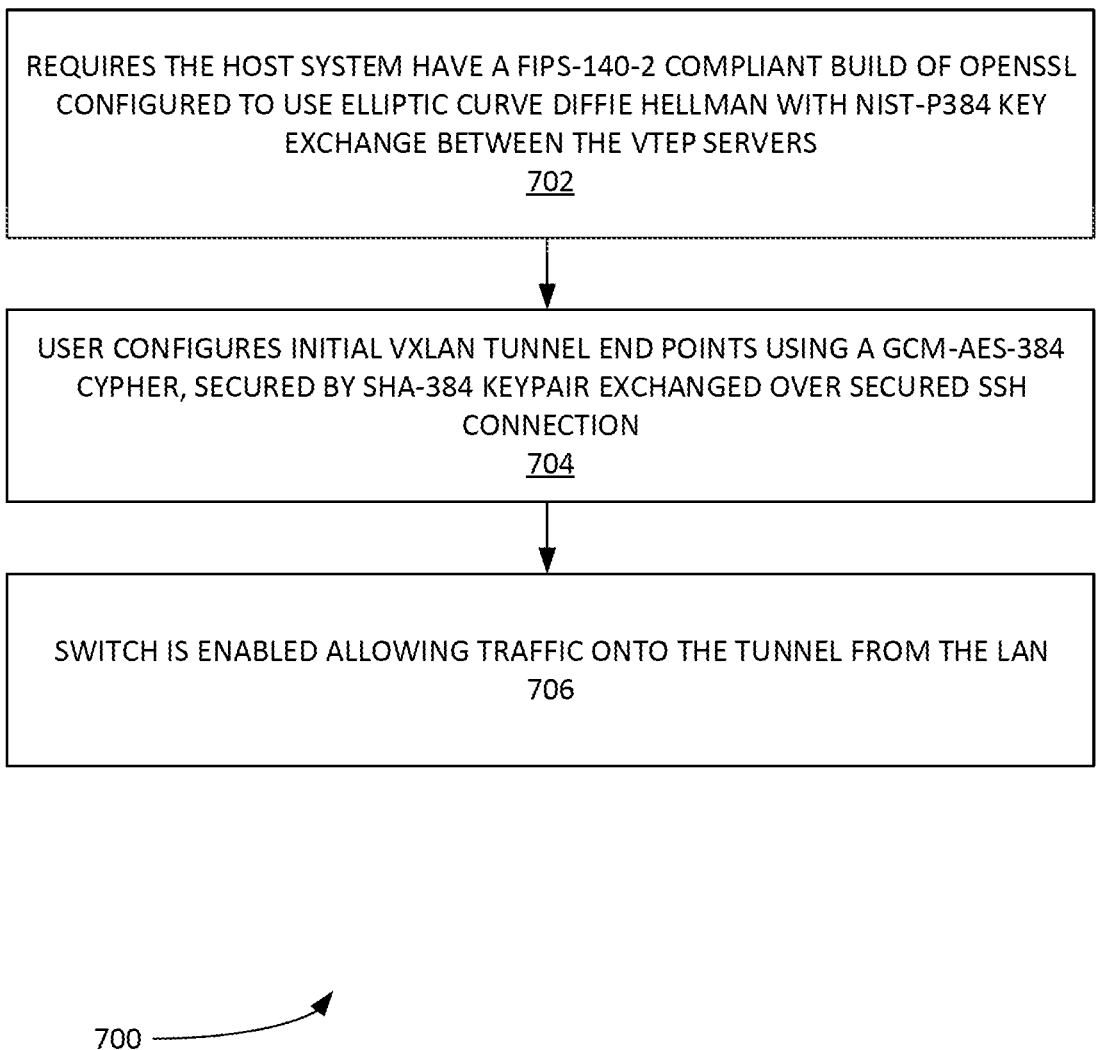
FIG. 7 illustrates an example process for securing an encrypted link, according to some embodiments.

FIG. 7 illustrates an example process 700 for securing an encrypted link, according to some embodiments. In step 702, process 700 requires the host system have a FIPS-140-2 Compliant build of OpenSSL (e.g. (OpenSSL-1.1.1), OpenSSH Client (7.9p1), and OpenSSH Server (7.9p1), etc.), configured to use Elliptic Curve Diffie Hellman with NIST-p384 key exchange between the VTEP servers.

In step 704, a user then configures the initial VxLAN Tunnel End Points using a GCM-AES-384 cypher, secured by a SHA-384 keypair exchanged over the secured SSH connection.

Once this secure tunnel is established, the VxLAN Tunnel End Point is re-configured (first on the remote server, then on the local server). The process is initiated from the local end point by logon onto the remote server using SSH via the encrypted VxLAN Tunnel.

A new VTEP is configured over the secured SSH session on the initial VxLAN Tunnel configured with GCM-AES-256 cypher utilizing unique sha-384 or 512 rx and tx keys. Upon completion of the re-configuration, the user completes the same process on the local server and restarts the link. Once the link is active new SSH session is established over the new link, and the initial single key VxLan Tunnel configuration is deleted.

In step 706, upon successful deletion of the initial tunnel, the switch is enabled allowing traffic onto the tunnel from the LAN. It is noted that specified types of cyphers, network protocols, hash functions and the like have been disclosed by way of example and not of limitation. These can be substituted/integrated with other types of cyphers, network protocols, hash functions and the like in some embodiments.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A method for packet orchestration to provide data encryption at an internet protocol (IP) layer, comprising the steps of:
   providing a quantum secure pre-shared key derivation scheme for a data link layer bulk encryption algorithm;
   setting up a separate communication channel using a Secure Shell Protocol (SSH) protocol;

leveraging Elliptic-curve Diffie-Hellman (ECDH) protocol over said separate communication channel to share a set of pre-shared keys;

providing a set of software-based network bridges;

assigning a set of network ports to the set of software-based specific bridges, wherein the set of network ports implement segmentation and isolation based on an organizational policy;

provisioning and configuring of a set of computer processing unit (CPU) cores to handle wire-speed data encryption and decryption on a per bridge segmentation standpoint, wherein each network bridge segment has a CPU core affinity, and recommended buffer allocation;

provisioning per bridge, an IP overlay encapsulation of a set of encrypted packets; and provisioning a Network interface card (NIC) offloading and packet steering functionality, wherein the NIC offloading and packet steering functionality provides network packet handling for network communications by orchestrating, using a selected NIC protocol, a hashing method that controls interrupt request queue affinity to allow for maximum distribution of network data across the set of CPU cores;

implementing load balancing across the set of CPU cores during implementation of the data link layer bulk encryption algorithm, wherein a NIC Driver specification of the NIC provides a method for interaction with one or more interrupts (IRQs) that provide access to a CPU queue of the CPU, wherein each CPU core of the set of CPU cores has an ability to encrypt or decrypt traffic, wherein when leveraging the CPU queue access to the CPU queue is controlled by a hash method on a set of four tuples of the TCP/IP Packet flow outbound and inbound to the NIC, wherein the set of four tuples of the TCP/IP Packet flow comprises a Destination IP/Source, an IP/Destination TCP, an UDP Port/Source TCP and a UDP Port, and wherein the hash method comprises a mathematical hash of the packet flow and controls to which CPU core the traffic is routed such that there is a fine grain use of each CPU core, as packet flow information is different for each flow using the set of four tuples.

2. The method of claim 1, wherein the set of network ports are assigned to set of software-based network bridges based on a set of communication and isolation requirements.

3. The method of claim 1, wherein the mechanism for provisioning per bridge is provided using segment isolation.

4. The method of claim 1, wherein the provisioning per bridge of the IP overlay encapsulation of the set of encrypted packets is implemented with a specified encapsulation/decapsulation functionality of an operating-system software and a network vendors ethernet controller.

5. The method of claim 1, wherein the IP overlay encapsulation is implemented with a tunneling protocol.

6. The method of claim 1, wherein the network packet handling of the NIC offloading and packet steering functionality comprises an encapsulation operation.

7. The method of claim 1, wherein the network packet handling of the NIC offloading and packet steering functionality comprises a checksum operation.

8. The method of claim 1, wherein the network packet handling of the NIC offloading and packet steering functionality comprises a buffer allocation operation.

9. The method of claim 1, wherein the provisioning per bridge and the IP overlay encapsulation of encrypted packets with post quantum encryption is implemented per the specifications of a specified Ethernet Controller manufacturer.

10. The method of claim 9, wherein an Ethernet Controller enables and configures the encapsulation/decapsulation offloading functionality.

11. The method of claim 10, wherein each CPU core has an ability to encrypt or decrypt traffic, based on the capabilities specified by a manufacturer.

* * * * *